US006193878B1

(12) United States Patent
Morse et al.

(10) Patent No.: US 6,193,878 B1
(45) Date of Patent: Feb. 27, 2001

(54) MULTI-MODAL METHOD AND APPARATUS FOR TREATING A SOLUTION (75) Inventors: Dwain E. Morse, Santa Barbara; Thomas G. Matherly, Lompoc; Joe DeWitt, Santa Barbara; Miroslav Colic, Isla Vista, all of CA (US)

(73) Assignee: ZPM, Inc., Santa Barbara, CA (US)

( * ) Notice: Subject to any disclaimer, the term of this patent is extended or adjusted under 35 U.S.C. 154(b) by 0 days.

(21) Appl. No.: 08/979,405

(22) Filed: Nov. 26, 1997

Related U.S. Application Data (63) Continuation-in-part of application No. 08/695,039, filed on Aug. 9, 1996, which is a continuation-in-part of application No. 08/554,458, filed on Nov. 7, 1995, now abandoned, and a continuation-in-part of application No. 08/378,462, filed on Jan. 25, 1995, now Pat. No. 5,606,723.
(60) Provisional application No. 60/032,235, filed on Dec. 2, 1996.
(51) Int. Cl.$^7$ ....................................................... B03C 1/02
(52) U.S. Cl. ............................. 210/85; 210/96.1; 210/223; 210/294; 210/512.1; 422/186; 422/186.01; 422/186.29; 422/186.04; 422/186.3; 204/661; 204/664; 204/667
(58) Field of Search ................................. 210/223, 221.1, 210/221.2, 222, 695, 748, 304, 294, 512.1, 143, 85, 96.1; 422/186, 186.01, 186.29, 186.04, 186.3; 204/661, 664, 667

(56) References Cited

U.S. PATENT DOCUMENTS

| | | |
|---|---|---|
| 3,577,207 * | 5/1971 | Kirjushin . |
| 4,064,047 | 12/1977 | Bernreiter et al. . |
| 4,274,970 | 6/1981 | Beitzel . |
| 4,279,743 * | 7/1981 | Miller . |
| 4,857,204 * | 8/1989 | Joklik . |
| 5,145,585 | 9/1992 | Coke . |
| 5,171,431 * | 12/1992 | Schulte . |
| 5,190,648 | 3/1993 | Ramsauer . |
| 5,217,607 | 6/1993 | Dalton, III et al. . |
| 5,224,604 * | 7/1993 | Duczmal et al. . |
| 5,225,089 * | 7/1993 | Benes et al. . |
| 5,236,670 * | 8/1993 | Iwata . |
| 5,466,367 | 11/1995 | Coate et al. . |
| 5,470,465 * | 11/1995 | Moorehead et al. . |
| 5,499,770 * | 3/1996 | McCullough . |
| 5,606,723 * | 2/1997 | Morse et al. . |
| 5,655,210 * | 8/1997 | Gregoire et al. . |
| 5,679,257 | 10/1997 | Coate et al. . |
| 5,792,272 * | 8/1998 | Van Os et al. . |

* cited by examiner

Primary Examiner—W. L. Walker
Assistant Examiner—Terry K. Cecil
(74) Attorney, Agent, or Firm—Kelly Bauersfeld Lowry & Kelley, LLP (57) ABSTRACT A multi-modal system for modifying water structure in a solution to continuously affect the hydration forces acting on the constituents in the solution. The system includes a containment vessel defining a treatment environment and including a wall defining a fluid passage and a fluid inlet. The inlet is coupled to the passage to centrifugally direct the solution helically along the wall. At least one electromagnetic energy delivery unit is disposed within the containment vessel. The electromagnetic energy delivery unit is responsive to generate variable electromagnetic energy sufficient to stimulate the solution and affect the hydration forces. Also provided is a controlling unit coupled to the electromagnetic delivery unit to alter the variable electromagnetic energy in response to spectral information about the solution and in accordance with optimal treatment parameters.

33 Claims, 5 Drawing Sheets

MULTI-MODAL METHOD AND APPARATUS FOR TREATING A SOLUTION

This application is based on U.S. Provisional Patent Application Ser. No. 60/032,235, filed Dec. 2, 1996, and is a continuation-in-part of U.S. patent application Ser. No. 08/695,039, filed Aug. 9, 1996 and still pending, which is a continuation-in-part of U.S. patent application Ser. No. 08/554,458, filed Nov. 7, 1995, now abandoned, and U.S. patent application Ser. No. 08/378,462, filed Jan. 25, 1995, now U.S. Pat. No. 5,606,723, the disclosures of which are expressly incorporated herein by reference.

FIELD OF THE INVENTION

The invention relates to water treatment systems and methods and more particularly a system and method of integrating a plurality of water treatment modes into a single treatment environment.

BACKGROUND OF THE INVENTION

Chemical-free water processing provides a popular alternative to environmentally undesirable chemical based treating. Conventional non-chemical techniques typically focus on ways of directly affecting constituents suspended in the water. By directly affecting the constituents, such as particles or other forms of contaminants, the colloidal relationships between respective particles may be altered. This often causes an overall coagulation, agglomeration or other condition allowing for the straightforward separation of the constituents from the water.

One form of direct particle manipulation is disclosed by Miller in U.S. Pat. No. 4,279,743. Commonly referred to as an air sparged hydrocyclone, the disclosed device typically utilizes a combination of centrifugal force and air sparging to remove hydrophobic particles from a fluid stream. The stream is fed under pressure into a cylindrical chamber having a porous wall. The inlet into the chamber is configured to direct the fluid stream into a generally spiral path along the wall. The angular momentum of the fluid generates a radially directed centrifugal force related to the fluid velocity and the radius of the circular path. The porous wall is contained within a gas plenum having gas pressurized to permeate the porous wall and overcome the centrifugal force acting on the fluid.

In operation, the unit receives and discharges the rapidly circulating solution while the air permeates through the porous wall. Air bubbles that emit from the wall are sheared into the fluid stream from the fluid flow. Micro-bubbles formed from the shearing attract the hydrophobic particles and float them toward the cylinder as a froth in a vortex. The centrally located froth vortex is then captured and exited from the cylinder.

Another form of direct particle manipulation is disclosed by Duczmal in U.S. Pat. No. 5,224,604. The treatment unit is similar in most respects to the Miller device by incorporating an air sparged hydrocyclone, but additionally employs a cylindrical permanent magnet disposed centrally around the cylinder. The magnet generates a static magnetic field directed radially inwardly towards the fluid stream and having a static magnetic flux sufficient to attract or repulse relatively large ferromagnetic and non-ferromagnetic particles, respectively, during the centrifugal separating operation.

While direct particle manipulation schemes work well for their particular applications, they tend to be particle specific. As a result, the mechanical and magnetic forces required to directly affect the particles must often be tailored to one form of particle treatment. Moreover, in the case of Duczmal, the permanent magnet is of a design suitable for generating only static magnetic fields that directly affect only relatively large particles. Unfortunately, static magnetic fields have been shown to offer only small performance enhancements as a complement to the normal operation of the air sparged hydrocyclone.

In an effort to solve the problems involved in water treatments that directly affect suspended constituents, the inventors have disclosed a unique treatment device and method in U.S. Pat. No. 5,606,723, and pending U.S. patent application Ser. No. 08/695,039, filed Aug. 9, 1996, and entitled "System For Delivering Electromagnetic Energy into a Solution", both of which are assigned to the assignee of the present invention. The treatment apparatus and method directly affects the water structure at the intermolecular level in a deliberate and controlled manner. This causes an indirect manipulation of the suspended constituents as the molecular water structure varies.

One problem commonly shared by conventional direct particle manipulation techniques and water structure modification methods involves the inability to successfully integrate more than one mode of treatment in a single environment. Multiple treatment modes are often necessary when the water suspends several forms of constituents, requiring more than one technology to efficiently treat the water. Conventionally, however, applying multiple treatment modes involves separately treating individual batches of water with individual treatment units acting non-cohesively in separate environments.

What is needed and heretofore unavailable is a multi-modal system and method having the capability of monitoring and controlling water treatment with technologies that directly and indirectly affect constituents in a single environment. The system and method of the present invention satisfy these needs.

SUMMARY OF THE INVENTION

The apparatus and method of the present invention provide an integrated water treatment capability that modifies the treatment parameters of one or more treatment modes to effect efficient and rapid water processing. As a result of the increased efficiencies, facility setup and operating costs are substantially reduced.

To realize the advantages above, the invention, in one form, comprises a multi-modal system for modifying water structure in a solution to continuously affect the hydration forces acting on the constituents in the solution. The system includes a containment vessel defining a treatment environment and including a wall defining a fluid passage and a fluid inlet. The inlet is coupled to the passage to centrifugally direct the solution helically along the wall. At least one electromagnetic energy delivery unit is disposed within the containment vessel. The electromagnetic energy delivery unit is responsive to generate variable electromagnetic energy sufficient to stimulate the solution and affect the hydration forces.

In another form, the invention comprises a method of affecting hydration forces in a solution stream to control intermolecular and surface forces acting on constituents in the solution. The method includes the steps of directing the solution stream through a first mode of treatment in a contained environment; exposing the solution stream to at least one further mode of treatment inside said contained environment comprising the delivery of variable electromagnetic energy.

Other features and advantages of the present invention will become apparent from the following detailed description thereof and the accompanying exemplary drawings.

DETAILED DESCRIPTION OF THE INVENTION

Figure 1:
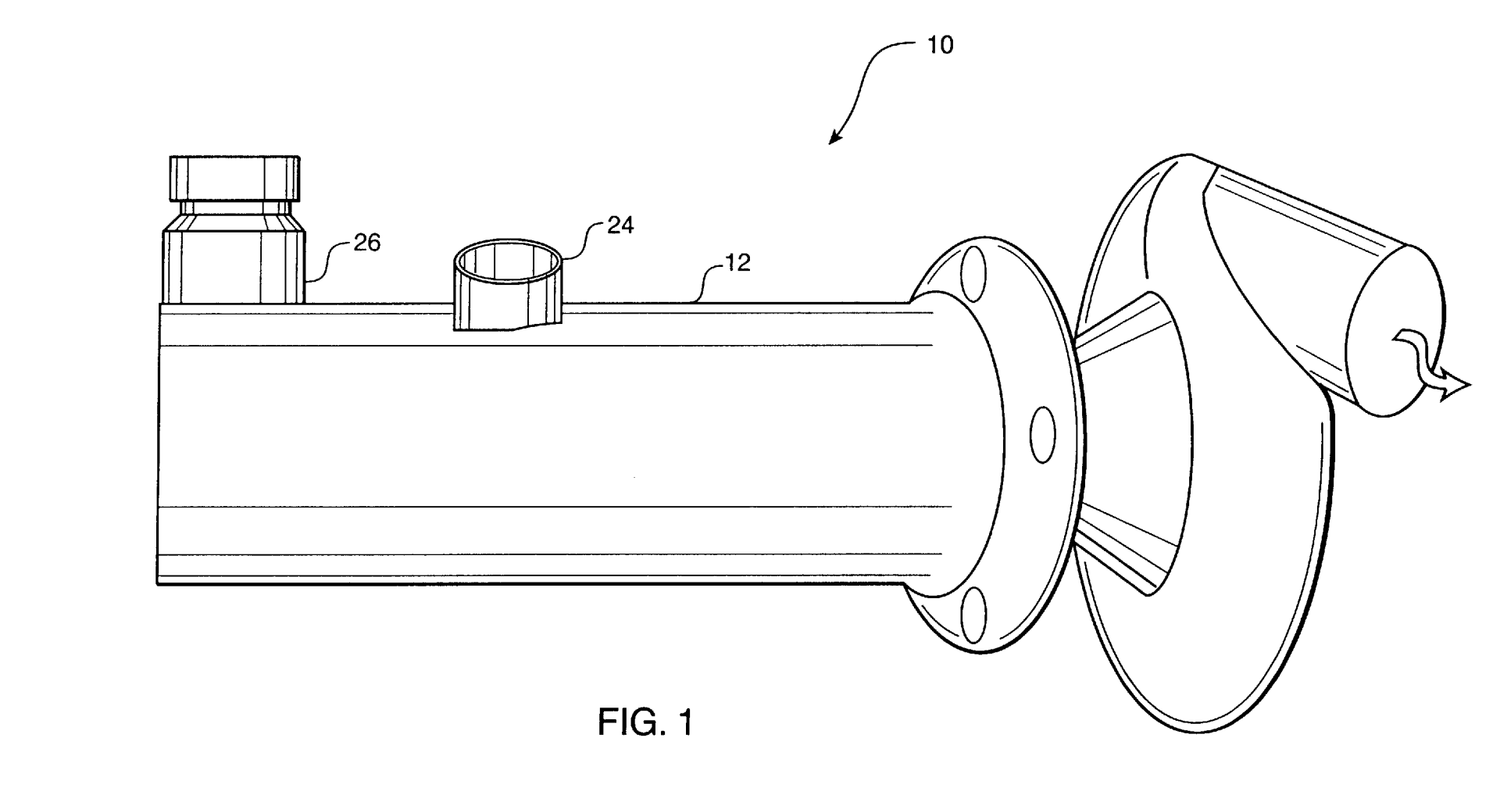
FIG. 1 is a longitudinal perspective view of a multi-modal system according to one embodiment of the present invention.
Figure 2:
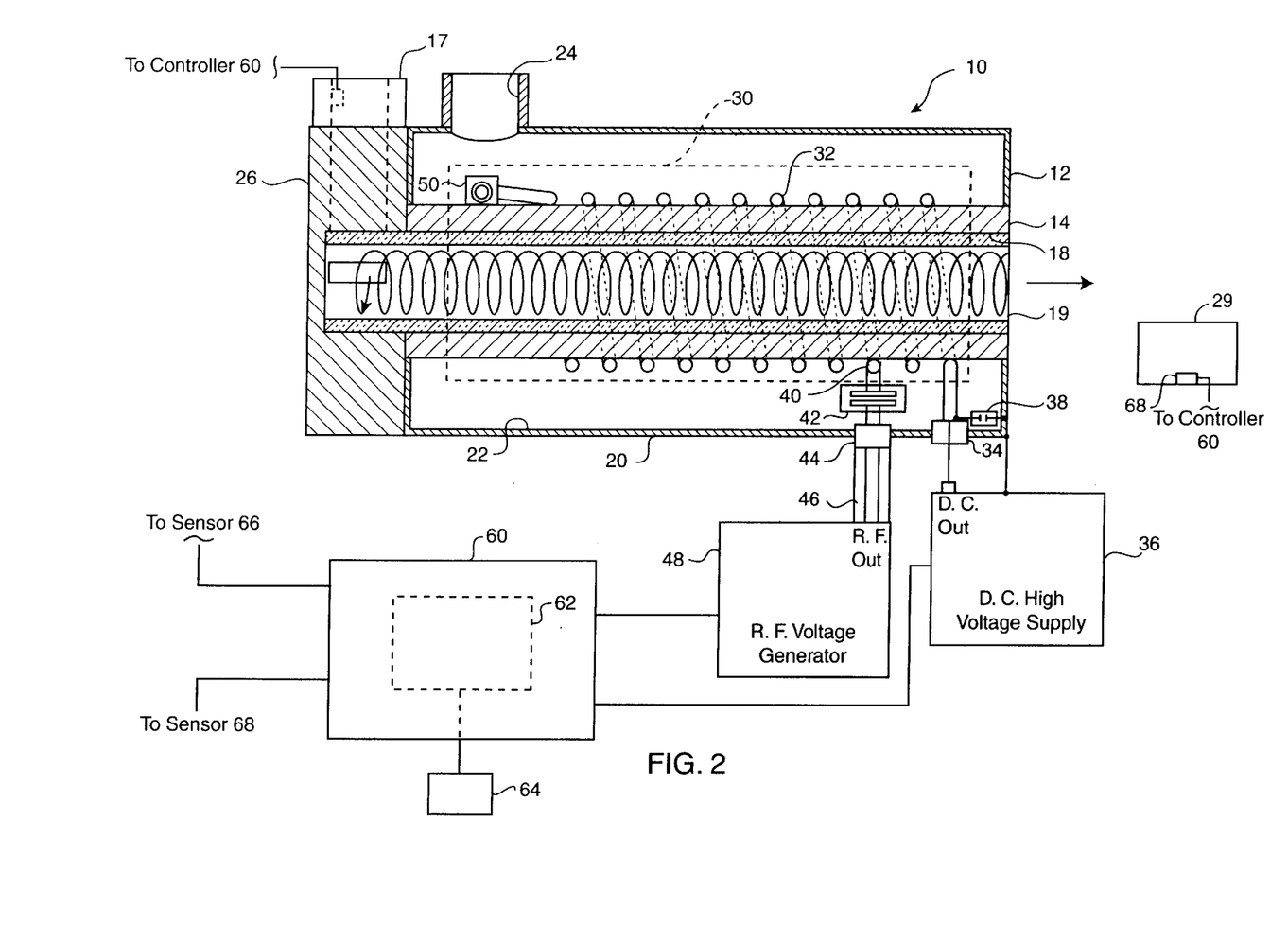
FIG. 2 is a partial longitudinal sectional view of one embodiment of the multi-modal system of the present invention, with certain components shown as functional blocks.
Figure 3:
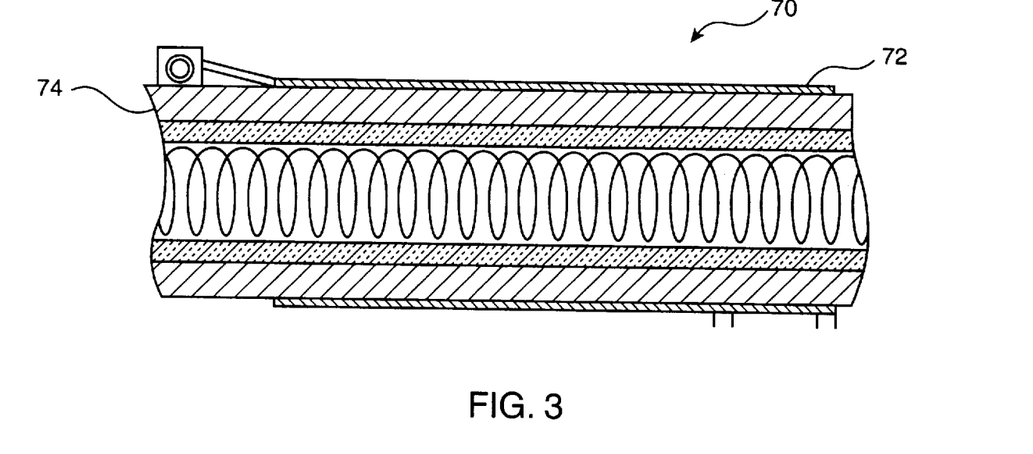
FIG. 3 is a fragmentary longitudinal sectional view showing an electromagnetic energy unit according to a further embodiment of the present invention.

Referring now to FIGS. 1 and 2, one embodiment of the multi-modal system of the present invention, generally designated 10, includes a containment vessel 12 defining a treatment environment for providing multiple modes of solution treatments. The treatment units are driven by a controller 60 that sets the treatment parameters according to the condition of the water in the single treatment environment.

Further referring to FIGS. 1 and 2, the containment vessel 12 comprises a first mode of treatment in the form of a conventional air sparged hydrocyclone or one such as that disclosed in pending U.S. Provisional Patent Application Serial No. 60/052626, entitled "Apparatus and Method For Separating Hydrophobic Particles From A Solution", filed Jul. 15, 1997, and incorporated herein by reference. The hydrocyclone includes an open ended porous tube 14 formed of an electrically non-conductive gas permeable material. The tube includes an interior wall 18 defining an inner fluid passage with respective inlet and outlet openings 17 and 19. An enlarged cylindrical hollow housing 20 is disposed concentrically around the first tube to form an annular chamber 22. The chamber includes an inlet 24 coupled to a source of regulated pressurized gas such as an air or oxygen lecture bottle (not shown). A solution input apparatus or accelerator 26 is mounted to the proximal end of the housing. The accelerator includes water manipulation elements (not shown) to manipulate and direct the flow of input fluid into a helical ribbon-like stream through the fluid passage 18 and exiting into an effluent tank 29.

Recent publications imply that additional gas content in bulk water increases the surface area of the liquid-gas interface, thereby improving the energetic processes that depend upon the liquid-gas interface. Thus, by integrating one or more sources of variable electromagnetic energy inside the hydrocyclone containment vessel, the improved effects may be accurately monitored and controlled. Variable electromagnetic energy, as that term is used throughout this disclosure, refers to resulting dynamic electromagnetic forces generated either directly or indirectly by the delivery unit. Such forces have been found to substantially increase the performance of conventional hydrocyclones.

To consistently obtain the improved performance noted above, disposed within the containment vessel 12 is an electromagnetic delivery unit 30 (FIG. 2) for delivering an additional mode of treatment into the system and configured to selectively deliver one or more forms of variable electromagnetic energy into the fluid as it circulates through the fluid passage 18. The delivery unit includes an electrical conductor 32 wound helically about the non-conductive porous tube 14 to define a helical resonator as described in U.S. Pat. No. 5,606,723. The distal end of the conductor couples through a hermetic high voltage connector 34 to a high voltage DC power source 36. Noise and AC transient signals are grounded to the housing 20 through an RF bypass capacitor 38. The electric field generated by the DC source acts to charge the gas as it enters the fluid stream, further influencing the liquid-gas interface to increase the probability of desirable interactions with constituents.

Further referring to FIG. 2, the helical conductor 32 is tapped by an RF connection at 40 as taught in U.S. Pat. No. 5,606,723. The tapped location represents the point measuring an approximate RF impedance of 50 ohms when the helical conductor is at a one-quarter wave resonance. The tap is fed through a capacitor 42 having a sufficiently low impedance at the one-quarter wave resonant point to provide good coupling efficiency at the resonance of the helical conductor. The coupling capacitor is connected to a hermetic RF coaxial connector 44 mounted to the housing 20. A coaxial cable 46 connects the helical conductor to an RF generator 48. The RF generator is tunable to the resonant frequency of the helical conductor and provides sufficient output to generate appropriate RF voltages at the end of the conductor 32.

With continuing reference to FIG. 2, the proximal end of the helical resonator 32 is coupled to a water-module interface device 50, such as that disclosed in U.S. Pat. No. 5,606,723 to produce controllable levels of RF photon radiation into the treatment area, and providing an additional mode of controllable treatment.

As a driver for the various treatment modes, the controller 60 may be of any configuration as is well known in the art to provide the capability of setting treatment parameters for the plurality of modes. An optional closed loop construction, shown in FIG. 2, includes a computer 62 having a plurality of control outputs directed to the various treatment mode generators 36 and 48, and including a memory 64 sufficient to maintain a database of water condition parameters versus mode application parameters. A plurality of sensing devices 66 and 68, such as pH meters, turbidity sensors, zeta potential meters, flowmeters, or the like, are disposed at the fluid passage inlet 17 and effluent tank 29. The respective sensor outputs are fed to the controller 60 which responds to the outputs to provide varying inputs to the respective treatment modes according to the computer database history.

The multi-modal system 10 is typically installed downstream of a solution source (not shown) and configured with an appropriately sized inlet and restrictors to accelerate and direct the water stream through the fluid passage 18 at a velocity sufficient to impart a particle separating centrifugal force. Forces in the range of 1 G to 2000 G's have been found to be effective for treatments in various applications.

During operation, the gas inlet 24 to the chamber 22 is opened to pressurize the chamber. Because of the gas permeability of the porous tube 14, gas is released through the tube and into the passage 18 where it encounters the fluid stream. As fluid flows through the passage, gas bubbles are sheared from the porous tube, resulting in relatively fine micro-bubbles entering the solution in both dissolved and undissolved states. The chamber inlet pressure is set at a level sufficient to introduce gas at an optimal gas-fluid ratio as is well known in the art.

In addition to solubly receiving the particle adhering micro-bubbles during circulation through the passage 18, the fluid also receives controlled exposures to one or more forms of electromagnetic energy from the watermodule 50, and the respective RF and DC forms generated by the helical resonator 32. The amplitudes, frequencies, and duty cycles of the respective energies delivered may be set by the controller 60 depending on the condition of the solution and the optimum treatment parameters.

Referring now to FIGS. 3, 4 and 5A through 5C, the electromagnetic energy delivery unit may comprise several embodiments to fully reflect the flexibility in the range of anticipated modes applicable in the present invention. For example, in FIG. 3, an electromagnetic energy delivery unit 70 comprises a porous cylindrical electrode 72 layered coaxially around a porous tube 74. Utilizing this construction provides a more uniform and predictable electromagnetic field interface acting on the solution stream as compared to the helical resonator embodiment 30 (FIG. 1).

Figure 4:
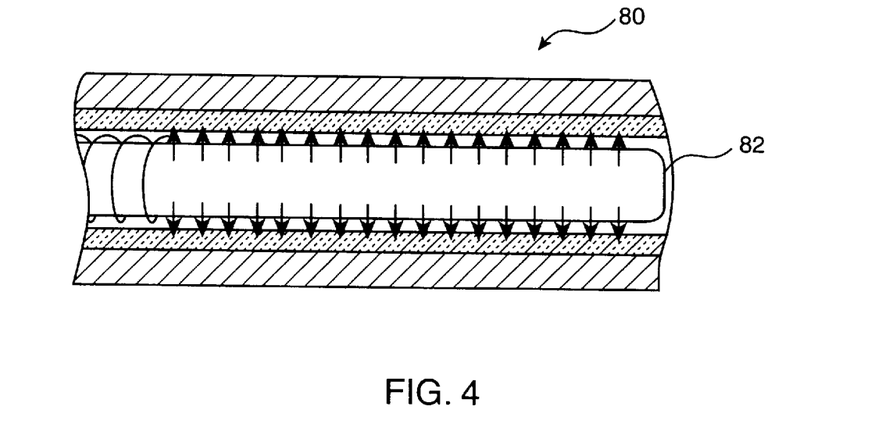
FIG. 4 is a fragmentary longitudinal sectional view showing an electromagnetic energy unit according to a further embodiment of the present invention.

Similarly, in FIG. 4, an electromagnetic energy delivery unit 80 includes a photon generator 82 for emitting photon energy in the range of frequencies spanning the infrared, visible light, and ultraviolet frequency bands. The photon generator is disposed axially inside the fluid passage to more effectively deliver the energy into the fluid stream. This particular mode provides not only the ability to restructure the water, but to additionally carry out photochemical processing and eliminate undesirable biologicals from the solution.

Figure 5A:
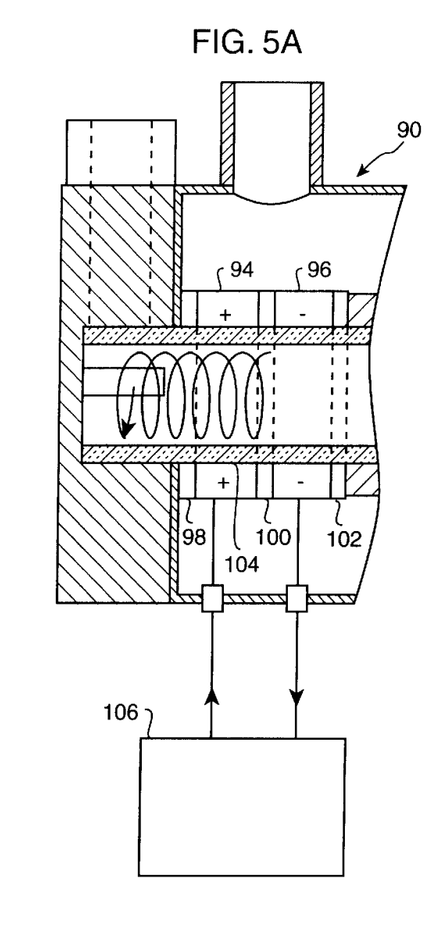
FIGS. 5A, 5B, and 5C are fragmentary longitudinal sectional views similar to FIG. 1 and illustrating additional embodiments of the electromagnetic energy unit according to further embodiments of the present invention.
Figure 5B:
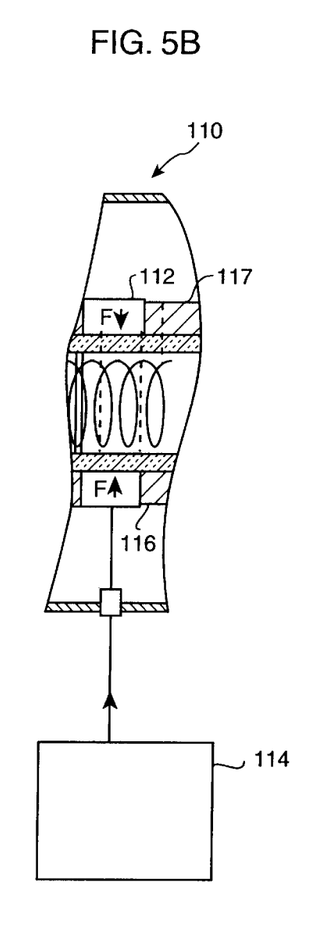
Figure 5C:
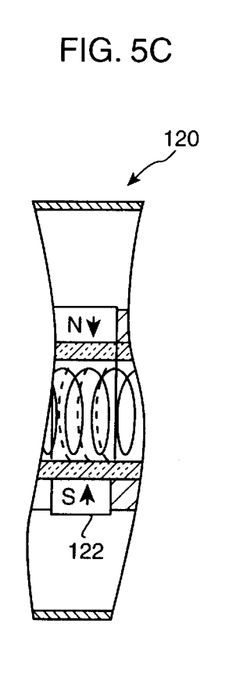

FIGS. 5A, 5B, and 5C illustrate three further embodiments of an electromagnetic energy delivery unit, generally designated 90, 110, and 120, respectively. Referring specifically to FIG. 5A, the electromagnetic energy delivery unit 90 is shown as an electrochemical construction. In this configuration, a pair of axially spaced-apart ring electrodes 94 and 96 cooperate with a plurality of radial insulators 98, 100, and 102 to form a portion of the proximal end of a fluid passage 104. A voltage source 106 comprising, for example, a DC, pulsed DC, or AC source 106 drives the electrodes to affect the solution in a manner allowing electrochemical reactions to occur just before sparging.

Referring more specifically to FIG. 5B, another embodiment of an electromagnetic energy delivery unit 110, utilizes an ultrasonic transducer ring 112 driven by an ultrasonic generator 114 and disposed annularly to form a segment of a fluid passage 116. Optionally positioning the transducer ring downstream of the sparge tube 117, creates additional benefits by introducing a sonoluminescence effect, as is well known to those skilled in the art. Applications for this embodiment include situations where agglomerated particles in the fluid stream would be more effectively sparged in a more dispersed form, or situations where sonoluminescently generated photon energies may have efficacious photochemical effects. For applications suitable for specialized variable magnetic forms of treatment, portion 120 (FIG. 5C) illustrates the insertion of a ring electromagnet 122 having radially displaced alternating poles to deliver a variable magnetic field into the solution stream.

Figure 6:
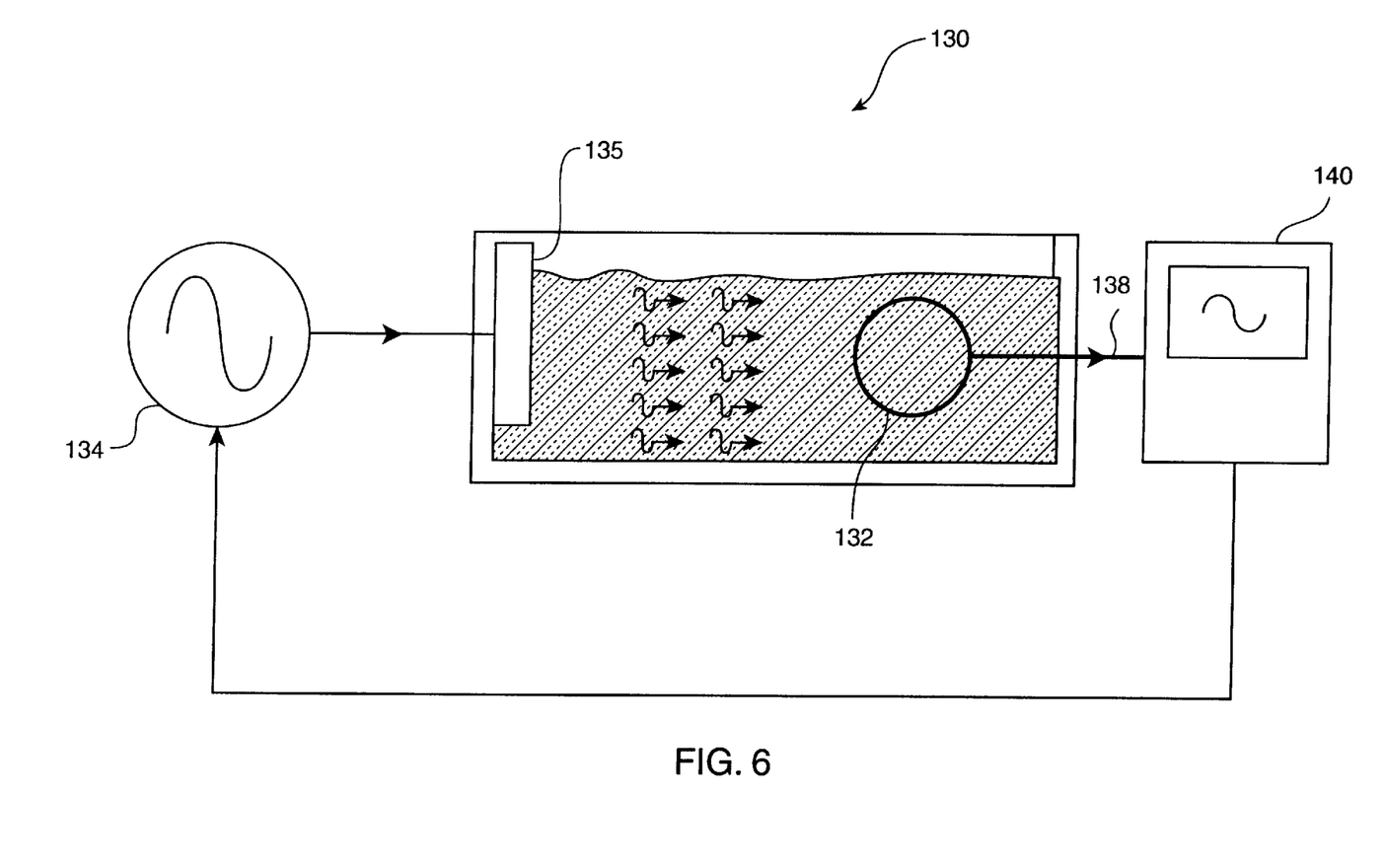
FIG. 6 is a block diagram of a solution content detection system according to a further embodiment of the present invention.

Referring now to FIG. 6, a control system, generally designated 130, according to a further embodiment of the multi-modal system, utilizes new discoveries in spectroscopy to detect solution conditions and provide feedback control to adjust multiple modes of treatment in a single environment. The inventors have discovered that solutions stimulated by electromagnetic energy irradiate magnetic fields having a spectral response dependent on the characteristics of the solution. This unexpected response of solutions stimulated with electromagnetic energy provides a new form of solution content detection and control.

The control system 130 includes a detector 132 that comprises a loop antenna on the order of approximately 10 millimeters. This approximate loop size establishes a loop resonance in the high gigahertz range, rather than the megahertz/low gigahertz range of interest. The antenna is constructed of semi-rigid coaxial cable having an inner conductor which forms the loop. The outer shield of the cable is terminated at one end and forms a Faraday shield to eliminate external electric field influences. The end of the loop connects to a coaxial cable 138 having a distal end terminated with a 50 ohm resistor matching the cable's characteristic impedance. The output of the loop antenna feeds a spectral analyzer 140 which has a control output connected to the tracking generator. The spectral analyzer provides a control signal to a tracking generator 134 to then stimulate a source transducer 135. The spectral information from the loop antenna also provides feedback to a controller (not shown) which is coupled to the respective treatment modes in the multi-modal system.

In operation, the spectral analyzer 140 generates and sends a tracking/control signal to the tracking generator 134. The control signal causes the tracking generator to provide a signal synchronous with the measurement frequency of the spectrum analyzer input. The signal range of the combination is approximately 14 Hertz to 20 gigahertz and at a leveled amplitude within the range of approximately 1 microvolt to 1 kilovolt. The tracking generator under control of the tracking/control signal generates a swept output signal within the defined RF range. The swept output signal drives a source transducer 135 which is preferably located proximate to or within a portion of the solution stream. The loop antenna 132, which is immersed in the fluid stream, detects the magnetic fields generated by the tracking generator 134 subject to the current characteristics of the solution. The spectral analyzer 140 extracts the spectral response information from the detected signals and feeds the response data to the controller. The controller then processes the acquired information by comparing the data to a database (not shown) to determine the optimal solution treatment modes and operating parameters corresponding to the detected solution characteristics.

Those skilled in the art will appreciate the many benefits and advantages afforded the present invention. Of significant importance is the ability to deliberately manipulate and control multiple treatment modes in a single environment. Moreover, employing variable electromagnetic energy provides substantial performance enhancements in solution treatments. By incorporating these advantages into a single water treatment environment, substantial cost reductions in facility construction and operation may be realized.

While a particular form of the invention has been illustrated and described, it will be apparent to those skilled in the art that various modifications and improvements can be made without departing from the scope of the invention as defined by the following claims. For example, while an air sparged hydrocyclone has been described throughout as providing one mode of treatment, it should be understood that non-sparged hydrocyclones are intended to be within the scope of the present invention. Additionally, the aforementioned modes described throughout this disclosure may be combined within the containment vessel in any serial or parallel fashion to satisfy specific customized applications.

What is claimed is:

1. A multi-modal system for modifying water structure in a solution to continuously affect the hydration forces acting on the constituents in said solution, said system including:
   a containment vessel defining a treatment environment, said containment vessel including a wall defining a fluid passage and a fluid inlet coupled to said passage to centrifugally direct said solution helically along said wall;
   at least one electromagnetic energy delivery unit disposed within said containment vessel, said at least one electromagnetic energy delivery unit responsive to an input source to generate electromagnetic energy of varying frequency over time sufficient to stimulate said solution and affect said hydration forces in order to aid in the separation of the constituents from the solution;
   a controller having a detection unit including a loop antenna for sensing one or more parameters indicative of the content of said solution and operative to generate feedback representative of said detected content; and
   a control unit including a spectral analyzer responsive to said detected feedback to determine a set of optimal treatment parameters and coupled to said at least one electromagnetic energy delivery unit to generate said imput source to alter said variable electromagnetic energy in accordance with said optimal treatment parameters.

2. A multi-modal system according to claim 1 wherein said containment vessel includes:
   a cylindrical housing; and
   a tubular fluid passage disposed concentrically within said housing.

3. A multi-modal system according to claim 1 wherein:
   said containment vessel comprises an air sparged hydrocyclone having a porous tubular fluid passage.

4. A multi-modal system according to claim 3 and further including:
   a gas charger disposed coaxially around said porous tube.

5. A multi-modal system according to claim 4 wherein:
   said gas charger comprises a cylindrical resonator, said cylindrical resonator coupled to said electromagnetic energy delivery unit.

6. A multi-modal system according to claim 1 wherein:
   said electromagnetic energy delivery unit comprises an RF water module.

7. A multi-modal system according to claim 1 wherein:
   said electromagnetic energy unit comprises a photon generator for emitting photon radiation within the ultraviolet, infrared and visible light frequency spectrum.

8. A multi-modal system according to claim 7 wherein:
   said photon generator is disposed axially within said fluid passage.

9. A multi-modal system according to claim 1 wherein:
   said electromagnetic energy delivery unit comprises an ultrasonic transducer.

10. A multi-modal system according to claim 9 wherein:
    said ultrasonic transducer comprises a ring-shaped element disposed axially in-line with said containment vessel and having an internal wall forming a portion of said fluid passage.

11. A multi-modal system according to claim 1 wherein:
    said electromagnetic energy delivery unit comprises an electrochemical module.

12. A multi-modal system according to claim 11 wherein:
    said electrochemical module includes a pair of oppositely charged ring electrodes disposed axially in-line with said containment vessel.

13. A multi-modal system according to claim 1 wherein:
    said electromagnetic energy delivery unit, comprises an electromagnet element.

14. A multi-modal system according to claim 13 wherein:
    said electromagnet element comprises a ring electromagnet disposed axially in-line with said containment vessel.

15. A multi-modal system for modifying water structure in a solution to continuously affect the hydration forces acting on the constituents in said solution, said system including:
    a containment vessel comprising a gas sparged hydrocyclone including a wall defining a porous tubular fluid passage and a fluid inlet coupled to said passage to centrifugally direct said solution helically along said wall;
    a gas charger comprising a helical resonator disposed coaxially around said porous tube;
    at least one electromagnetic energy delivery unit disposed within said containment vessel and coupled to said helical resonator, said at least one electromagnetic energy delivery unit responsive to an input source to generate electromagnetic energy of varying frequency over time sufficient to stimulate said solution and affect said hydration forces in order to aid in the separation of the constituents from the solution; and
    a controlling unit coupled to said at least one electromagnetic delivery unit to alter said variable electromagnetic energy in response to spectral information about said solution and in accordance with optimal treatment parameters.

16. A multi-modal system according to claim 15 wherein said containment vessel includes a cylindrical housing disposed concentrically about said tubular fluid passage.

17. A multi-modal system according to claim 15 and further including:
    a controller having a detection unit including a loop antenna for sensing one or more parameters indicative of the content of said solution and operative to generate feedback representative of said detected content; and
    a control unit including a spectral analyzer responsive to said detected feedback to determine a set of optimal treatment parameters and coupled to said at least one electromagnetic energy delivery unit to generate said input source to alter said variable electromagnetic energy in accordance with said optimal treatment parameters.

18. A multi-modal system for modifying water structure in a solution to continuously affect the hydration forces acting on the constituents in said solution, said system including:
    a containment vessel comprising a gas sparged hydrocyclone including a wall defining a porous tubular fluid passage and a fluid inlet coupled to said passage to centrifugally direct said solution helically along said wall;

a gas charger comprising a porous cylindrical electrode disposed coaxially around said porous fluid passage tube;

at least one electromagnetic energy delivery unit disposed within said containment vessel and coupled to said porous cylindrical electrode, said at least one electromagnetic energy delivery unit responsive to an input source to generate electromagnetic energy of varying frequency over time sufficient to stimulate said solution and affect said hydration forces in order to aid in the separation of the constituents from the solution; and a controlling unit coupled to said at least one electromagnetic delivery unit to alter said variable electromagnetic energy in response to spectral information about said solution and in accordance with optimal treatment parameters.

19. A multi-modal system according to claim 18, wherein said containment vessel includes a cylindrical housing disposed concentrically about said tubular fluid passage.

20. A multi-modal system according to claim 18, and further including:

a controller having a detection unit including a loop antenna for sensing one or more parameters indicative of the content of said solution and operative to generate feedback representative of said detected content; and a control unit including a spectral analyzer responsive to said detected feedback to determine a set of optimal treatment parameters and coupled to said at least one electromagnetic energy delivery unit to generate said input source to alter said variable electromagnetic energy in accordance with said optimal treatment parameters.

21. A multi-modal system for modifying water structure in a solution to continuously affect the hydration forces acting on the constituents in said solution, said system including:

a containment vessel comprising a gas sparged hydrocyclone including a wall defining a porous tubular fluid passage and a fluid inlet coupled to said passage to centrifugally direct said solution helically along said wall;

at least one electromagnetic energy delivery unit including an RF water module, comprising:
a signal generator for generating a modulated RF signal output;
a first housing having closed ends defining a first water-tight chamber;
coil means contained within said first chamber for delivering a magnetic field into the solution;
voltage probe means coupled to said coil means for delivering an electric field into the solution;
means for coupling said modulated RF signal to said coil means;

wherein said at least one electromagnetic energy delivery unit is responsive to an input source to generate electromagnetic energy of varying frequency over time sufficient to stimulate said solution and effect said hydration forces in order to aid in the separation of the constituents from the solution; and a controlling unit coupled to said at least one electromagnetic delivery unit to alter said variable electromagnetic energy in response to spectral information about said solution and in accordance with optimal treatment parameters.

22. A multi-modal system according to claim 21 wherein said containment vessel includes a cylindrical housing disposed concentrically about said tubular fluid passage.

23. A multi-modal system according to claim 22 and further including:

a controller having a detection unit including a loop antenna for sensing one or more parameters indicative of the content of said solution and operative to generate feedback representative of said detected content; and a control unit including a spectral analyzer responsive to said detected feedback to determine a set of optimal treatment parameters and coupled to said at least one electromagnetic energy delivery unit to generate said input source to alter said variable electromagnetic energy in accordance with said optimal treatment parameters.

24. A multi-modal system for modifying water structure in a solution to continuously affect the hydration forces acting on the constituents in said solution, said system including:

a containment vessel comprising a gas sparged hydrocyclone including a wall defining a porous tubular fluid passage and a fluid inlet coupled to said passage to centrifugally direct said solution helically along said wall;

at least one electromagnetic energy delivery unit comprising a photon generator disposed axially within said fluid passage for emitting photon radiation within the ultraviolet, infrared and visible light frequency spectrum;

wherein said at least one electromagnetic energy delivery unit is responsive to an input source to generate electromagnetic energy of varying frequency over time sufficient to stimulate said solution and affect said hydration forces in order to aid in the separation of the constituents from the solution; and a controlling unit coupled to said at least one electromagnetic delivery unit to alter said variable electromagnetic energy in response to spectral information about said solution and in accordance with optimal treatment parameters.

25. A multi-modal system according to claim 24 wherein said containment vessel includes a cylindrical housing disposed concentrically about said tubular fluid passage.

26. A multi-modal system according to claim 24, and further including:

a controller having a detection unit including a loop antenna for sensing one or more parameters indicative of the content of said solution operative to generate feedback representative of said detected content; and a control unit including a spectral analyzer responsive to said detected feedback to determine a set of optimal treatment parameters and coupled to said at least one electromagnetic energy delivery unit to generate said input source to alter said variable electromagnetic energy in accordance with said optimal treatment parameters.

27. A multi-modal system for modifying water structure in a solution to continuously affect the hydration forces acting on the constituents in said solution, said system including:

a containment vessel comprising a gas sparged hydrocyclone including a wall defining a porous tubular fluid passage and a fluid inlet coupled to said passage to centrifugally direct said solution helically along said wall;

at least one electromagnetic energy delivery unit comprising an ultrasonic transducer disposed within said containment vessel, said ultrasonic transducer comprising a ring-shaped element disposed axially in-line with said containment vessel and having an internal wall forming a portion of said fluid passage;

wherein the at least one electromagnetic energy delivery unit is responsive to an input source to generate electromagnetic energy of varying frequency over time sufficient to stimulate said solution and affect said hydration forces in order to aid in the separation of the constituents from the solution; and a controlling unit coupled to said at least one electromagnetic delivery unit to alter said variable electromagnetic energy in response to spectral information about said solution and in accordance with optimal treatment parameters.

28. A multi-modal system according to claim 27, wherein said containment vessel includes a cylindrical housing disposed concentrically about said tubular fluid passage.

29. A multi-modal system according to claim 27, and further including:

a controller having a detection unit including a loop antenna for sensing one or more parameters indicative of the content of said solution operative to generate feedback representative of said detected content; and a control unit including a spectral analyzer responsive to said detected feedback to determine a set of optimal treatment parameters and coupled to said at least one electromagnetic energy delivery unit to generate said input source to alter said variable electromagnetic energy in accordance with said optimal treatment parameters.

30. A multi-modal system for modifying water structure in a solution to continuously affect the hydration forces acting on the constituents in said solution, said system including:

a containment vessel comprising a gas sparged hydrocyclone including a wall defining a porous tubular fluid passage and a fluid inlet coupled to said passage to centrifugally direct said solution helically along said wall;

at least one electromagnetic energy delivery unit comprising an electrochemical module disposed within said containment vessel, said at least one electromagnetic energy delivery unit responsive to an input source to generate electromagnetic energy of varying frequency over time sufficient to stimulate said solution and affect said hydration forces in order to aid in the separation of the constituents from the solution while maintaining the integrity and fluid characteristic of the solution; and a controlling unit coupled to said at least one electromagnetic delivery unit to alter said variable electromagnetic energy in response to spectral information about said solution and in accordance with optimal treatment parameters.

31. A multi-modal system according to claim 30, wherein said containment vessel includes a cylindrical housing disposed concentrically about said tubular fluid passage.

32. A multi-modal system according to claim 30, wherein:

said electrochemical module includes a pair of oppositely charged ring electrodes disposed axially in-line with said containment vessel.

33. A multi-modal system according to claim 30, and further including:

a controller having a detection unit including a loop antenna for sensing one or more parameters indicative of the content of said solution and operative to generate feedback representative of said detected content; and a control unit including a spectral analyzer responsive to said detected feedback to determine a set of optimal treatment parameters and coupled to said at least one electromagnetic energy delivery unit to generate said input source to alter said variable electromagnetic energy in accordance with said optimal treatment parameters.

* * * * *